3,142,685
SUBSTITUTED DIHYDROXYPHOSPHORINANIUM, DIHYDROXYPHOSPHOLANIUM AND DIHYDROXYPHOSPHEPANIUM SALTS

Sheldon A. Buckler and Martin Epstein, Stamford, Conn., assignors to American Cyanamid Company, New York, N.Y., a corporation of Maine
No Drawing. Filed Jan. 11, 1962, Ser. No. 165,677
11 Claims. (Cl. 260—340.7)

The present invention relates to new and useful organophosphorus compounds and to the preparation thereof. More particularly, the instant discovery concerns the preparation of novel heterocyclic phosphonium salts by reaction of secondary organic phosphines with dialdehydes. The heterocyclic phosphonium salts contemplated herein correspond to the formula

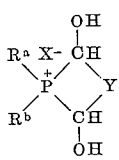

wherein X represents the anion of a water-soluble acid, such as HCl, HBr, HI, $HNO_3$, $H_3PO_4$, $H_2SO_4$, acetic acid, citric acid, tartaric acid, and the like; and Y represents substituted and unsubstituted, branched and straight chain divalent aliphatic or alkylene groups providing 2 to 4 cabon atoms in the phosphorus-containing ring; substituted and unsubstituted divalent aromatic or arylene groups in which from two to four consecutive ring carbon atoms of the arylene ring provide, respectively, from two to four consecutive carbon atoms in the phosphorus-containing ring; substituted and unsubstituted divalent alicyclic or cycloalkylene groups in which from two to four consecutive carbon atoms of the cycloalkylene ring provide, respectively, from two to four consecutive carbon atoms in the phosphorus-containing ring; $R^a$ and $R^b$, respectively, represents substituted and unsubstituted, branched and straight chain alkyl, substituted and unsubstituted, branched and straight chain alkenyl in which any given linear carbon chain of said alkyl or alkenyl contains from 1 to 18 carbon atoms, and, preferably, said substituted alkyl or alkenyl has its substitutent or substituents on a carbon atom at least 3 carbon atoms removed from the phosphorus atom of the formula; substituted and unsubstituted cycloalkyl; substituted and unsubstituted cycloalkenyl substituted and unsubstituted aryl; $R^a$ and $R^b$, respectively, are attached directly to the phosphorus atom through a carbon atom, $R^a$ and $R^b$ may be the same or different, and $R^a$ and $R^b$ combined form a cyclic secondary phosphine selected from the group consisting of a 2,4,6-trisecondary-alkyl-1,3-dioxa-5-phosphacyclohexane of the formula

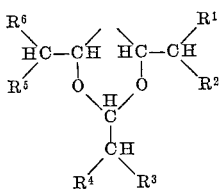

wherein $R^1$ to $R^6$ are, respectively, alkyl having 1 to 10 carbon atoms, and a 1,3,5,7-tetraalkyl-2,6,10-trioxa-9-phosphatricyclo[3·3·1·1³ ⁷]decane of the formula

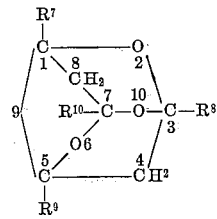

wherein $R^7$, $R^8$, $R^9$ and $R^{10}$, respectively, represents a member selected from the group consisting of $CF_3$ and lower alkyl.

Said cyclic secondary phosphine residues are the subject, respectively, of co-pending U.S. Serial No. 766,656, filed October 13, 1958, now U.S. Patent No. 2,984,683, and U.S. Serial No. 41,027, filed July 6, 1960, now U.S. Patent No. 3,050,531, which will be discussed in greater detail hereinafter.

According to the present invention a dialdehyde of the formula

wherein Y is the same as Y in the generic product formula above and the substituents for alkylene and arylene in the definition of Y being selected from the group consisting of halogen, hydroxyl, carbamyl, carbalkoxy, carboxy, lower alkoxy, phenyl and phenoxy, is reacted with a secondary phosphine,

wherein $R^a$ and $R^b$ have the meaning given above and the substituents for alkyl, alkenyl, cycloalkyl, cycloalkenyl and phenyl in the definition of $R^a$ and $R^b$, respectively, being selected from the group consisting of halogen, hydroxyl, carbamyl, carbalkoxy, carboxy, lower alkoxy, phenyl, phenoxy, amino, nitro, ureido and sulfo, and a mineral acid in the presence of water to produce compounds of the type described above. If desired, also, the reaction may be carried out in the presence of a water-miscible organic medium or solvent. Typical suitable water-soluble media are tetrahydrofuran, lower aliphatic monohydric alcohols, dioxane, and the like.

As will be seen hereinafter, products of the instant discovery in which X is an organic anion, such as

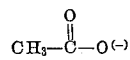

are produced by subjecting the organophosphorus salt of a mineral acid produced as taught above to an exchange reaction with an organic compound capable of exchanging its anion constituent with the anion constituent of the organophosphorus salt. For example, an organophosphorus sulfate of the type contemplated herein may be reacted with barium acetate to produce the corresponding organophosphorus acetate and barium sulfate.

Other typical organic salts capable of giving up their anions to the organophosphorus salts contemplated herein are the acetates of lead, silver, mercury, calcium, and the like. Similarly, metal citrates, metal tartrates, such as silver citrate, silver tartrate, and the like, will exchange their anion constituents for those of the organophosphorus mineral acid derivatives disclosed above. Although equimolecular proportions of these reactants are generally used, ratios greater than 1:1 are suitable.

Likewise, according to a still further embodiment of the present invention, an organophosphorus chloride prepared as shown above may be converted to its corresponding nitrate by reacting the chloride with silver nitrate and forming the corresponding organophosphorus nitrate and silver chloride.

The dialdehyde and organic phosphine reactants are employed herein, preferably, in the proportion of one mole of dialdehyde per mole of phosphine. However, ratios as high as 10:1 and as low as 2:15, dialdehyde to organic phosphine, are suitable.

The ratio of mineral acid to organic phosphine employed is generally at least about 1 mole of mineral acid per mole of phosphine, although ratios as high as 20:1 or more, mineral acid to organic phosphine, are effective. In the case where the product anion desired (X) is $\frac{1}{2}SO_4^=$, however, the ratio of

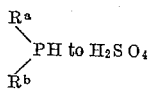

must be 1 to 0.5; otherwise, the product anion would be mostly $HSO_4^-$, instead of $\frac{1}{2}SO_4^=$.

It is well to remember, however, that large excesses of readily volatilized mineral acids (e.g. HCl, HBr, etc.) are more tolerable, from the standpoint of product purification, than are large excesses of relatively non-volatile acids, such as $H_2SO_4$, $H_3PO_4$, and the like.

In general the reaction takes place at temperatures in the range from about 0° C. to about 100° C., and preferably from 15° C. to 60° C.

According to a typical embodiment of the present invention diisobutylphosphine, glutaraldehyde, methanol, tetrahydrofuran and concentrated hydrochloric acid are refluxed under anerobic conditions. The resulting reaction mixture is rid of its solvent and 1,1-diisobutyl-2,6-dihydroxyphosphorinanium chloride recovered. In equation form this reaction is as follows:

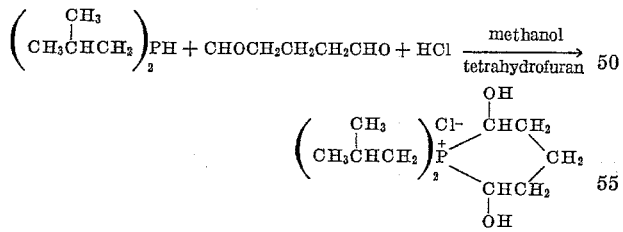

Preferably, the mineral acid is added to the reactants.
Typical secondary phosphines

within the purview of the instant invention are:

diphenylphosphine;
bis(4-chlorophenyl)phosphine;
dibutylphosphine;
didodecylphosphine;
bis(2-phenylethyl)phosphine;
dicyclohexylphosphine;
bis(3-ethylhexyl)phosphine;
bis(2,4,4-trimethylpentyl)phosphine;
bis(3-chloropropyl)phosphine;
bis(2-butenyl)phosphine;
ethylhexylphosphine;
dioctylphosphine;
diisooctylphosphine;
bis(3-methoxycyclohexyl)phosphine;
bis(3-ethoxycyclopentenyl)phosphine;
2,4,6-tris(3-heptyl-1,3-dioxa-5-phosphacyclohexane;
2-(3-hexyl)-4,6-diisopropyl-1,3-dioxa-5-phosphacyclohexane;
bis(2-phenoxyethyl)phosphine;
bis(2-aminoethyl)phosphine;
bis(2-nitropropyl)phosphine;
bis(2-sulfoethyl)phosphine;
bis(carbamylmethyl)phosphine;
bis(2-ureidoethyl)phosphine;
bis(hydroxymethyl)phosphine;
bis(1-hydroxyhexyl)phosphine;
bis(3-carboxypropyl)phosphine;
bis(3-carbethoxypropyl)phosphine;
bis(4-aminophenyl)phosphine;
bis[2-(4-aminophenyl)ethyl]phosphine;

and the like; and mixtures thereof, such as a reactant mixture of dioctylphosphine and diisooctylphosphine, and similar mixtures.

Typical dialdehydes

which may be reacted with secondary organic phosphines contemplated herein to produce the corresponding heterocyclic phosphonium salts are the following: 3-chloroglutaraldehyde, 3-butylsuccinaldehyde, phthaldehyde, 3-(p-chlorophenyl)-glutaraldehyde, 3-carbamylglutaraldehyde, 2-hydroxyadipaldehyde, 3-acyloxyglutaraldehyde, 4-carboxyphthaldehyde, 2-carbomethoxysuccinaldehyde, 3-methoxyadipaldehyde, 3-phenoxyphthaldehyde, 3-methyleneglutaraldehyde, and the like.

Cyclic secondary phosphine reactants, viz., 2,4,6-trisecondary-alkyl-1,3-dioxa-5-phosphacyclohexanes, of the type contemplated herein are prepared, as indicated hereinabove, according to the teachings of U.S. application Serial No. 766,656, filed October 13, 1958, now U.S. Patent No. 2,984,683, which co-pending application is incorporated herein by reference.

Pursuant to 766,656 an alkyl aldehyde having an alkyl branch in the alpha position, such as isobutyraldehyde, and corresponding to the formula

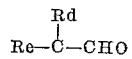

in which Rd and Re represent alkyl chains of 1 to 10 carbon atoms, is reacted with phosphine in the presence of an aqueous mineral acid solution to produce the corresponding 2,4,6-trisecondaryalkyl-1,3-dioxa-5-phosphacyclohexane, such as 2,4,6-triisopropyl-1,3-dioxa-5-phosphacyclohexane. If desired, a water-soluble, inert organic solvent may be present, such as terahydrofuran, dioxane, a lower aliphatic monohydric alcohol, the dimethyl ether of ethylene glycol, and the like.

The aqueous mineral acid employed in the reaction of phosphine with an alkyl aldehyde as defined above doubles as catalyst and solvent. Among the mineral acids contemplated are HCl, HBr, HI, $H_2SO_4$, $H_3PO_4$, and the like. While concentrated mineral acids are preferred, concentrations in the range of 0.1 to 12 normal are suitable.

In general, these reactions are carried out at temperatures in the range of 0° C. to 80° C., preferably, 15° C. to 60° C.

Among the numerous alkyl aldehydes contemplated by the formula

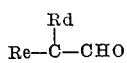

are 2-ethylhexaldehyde, 2-ethylbutyraldehyde, 2-methyloctaldehyde, 2-propylpentaldehyde, 2-methylheptaldehyde, and the like.

The amount of aldehyde employed in the reaction with respect to phosphine is, generally, at least 3 molar equivalents of aldehyde per molar equivalent of phosphine. However, excesses of either constituent as great as 10.1, aldehyde to phosphine, or phosphine to aldehyde, or even greater, are suitable.

Typical 2,4,6-trisecondary-alkyl-1,3-dioxa-5-phosphacyclohexane reactants are: 2,4,6-triisopropyl-1,3-dioxa-5-phosphacyclohexane, 2,4,6-tris(3-heptyl)-1,3-dioxa-5-phosphacyclohexane, 2-(3-hexyl)4,6-diisopropyl-1,3-dioxa-5-phosphacyclohexane.

The 1,3,5,7-tetraalkyl-2,6,10-trioxa-9-phosphatricyclo[3·3·1·1$^{3·7}$]decane reactants contemplated herein are prepared, as pointed out above, according to U.S. application Serial No. 41,027, filed July 6, 1960, now U.S. Patent No. 3,050,531, which co-pending application is incorporated herein by reference.

Pursuant to 41,027 phosphine is reacted with an alkyl-β-diketone to produce the corresponding 1,3,5,7-tetraalkyl-2,6,10-trioxa-9-phosphatricyclo[3·3·1·1$^{3·7}$]decane.

Pursuant to a particular embodiment, phosphine is reacted with 2,4-pentanedione in the presence of hydrochloric acid to yield 1,3,5,7-tetramethyl-2,6,10-trioxa-9-phosphatricyclo[3·3·1·1$^{3·7}$]decane as follow:

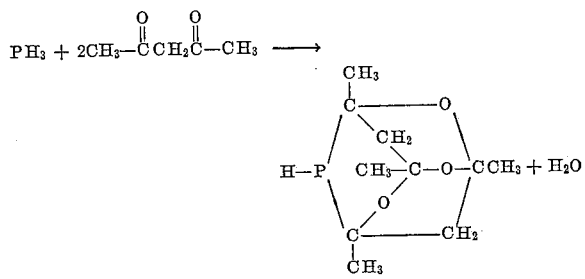

Typical β-diketone reactants are hexafluoro-substituted pentanedione, such as 1,1,1,5,5,5-hexafluoro-2,4-pentanedione, 2,4-pentanedione, 3,5-heptanedione, 2,4-hexanedione, 4,6-nonanedione, 5,7-undecanedione, and other like alkyl $C_5$-$C_{11}$-β-diketones.

The reactions are carried out rather readily within a wide range of temperatures. For example, temperatures on the order of —20° C. to 200° C., consistent with practicality, are contemplated. Preferably, however, temperatures in the range of 15° C. to 80° C., usually ambient temperatures, are employed.

Likewise, while reactions are usually carried out at atmospheric pressure, sub-atmospheric and super-atmospheric pressures may be employed, particularly when temperatures in the higher portion of the range just given are employed. Pressures on the order of 20 pounds per square inch to 80 pounds per square inch are very suitable; nevertheless, pressures as high as 1500 pounds per square inch or greater are contemplated.

Stoichiometric amounts of the reactants are generally employed, i.e., one mole of phosphine with 2 moles of the alkyl-β-diketone reactant to produce the corresponding tri-oxygen decane product. However, amounts greater than these indicated may be employed. For example, up to 20 molar equivalents or more of the diketone to one of phosphine may be employed.

Other than mineral acids, such as HCl, $H_2SO_4$, HBr, $H_3PO_4$, $HNO_3$, HI, and the like, other strong acids, such as inert organic acids, may be employed. Typical of these are alkyl- or aryl-phosphonic or sulfonic acids, such as methanesulfonic acid, benzenesulfonic acid, benzenephosphonic acid, and the like. Characteristically, all of these inorganic and organic acids are, under the reaction conditions contemplated, inert with respect to the reactants and their reaction products.

By the same token, these reactions may be carried out in an aqueous medium; an alcohol medium, such as that of ethyl alcohol, methyl alcohol; an ether medium, such as that of diethylether, dioxane, tetrahydrofuran; a hydrocarbon medium, such as that of benzene, xylene, toluene, hexane; an acetone medium; and the like. As is evident, numerous inert organic solvents may be employed. By inert is meant that the solvents under the conditions of the reaction do not react to any substantial degree with the reactants and their products, and in addition are inert with respect to the strong inorganic and organic acids employed in the reaction.

Typical 1,3,5,7-tetraalkyl-2,6,10-trioxatuted-9-phosphatricyclo[3·3·1·1$^{3·7}$]decane reactants contemplated herein are 1,3,5,7-tetramethyl-2,6,10-trioxa-9-phosphatricyclo[3·3·1·1$^{3·7}$]decane, 1,3,5,7-tetra(trifluoromethyl)-2,6,10-trioxa-9-phosphatricyclo[3·3·1·1$^{3·7}$]decane and the like.

The present discovery will best be understood by reference to the illustrative examples which follow. The limitations contained in these examples are not to be considered as restrictions upon the scope of the invention, since it will be obvious to one skilled in the art that numerous modifications within the purview of the invention are possible and, by the same token, are contemplated herein.

To illustrate the process and products of co-pending U.S. application Serial No. 766,656, now U.S. Patent No. 2,984,683, incorporated herein by reference, the following examples are provided:

EXAMPLE A

*2,4,6-Triisopropyl-1,3-Dioxa-5-Phosphacyclohexane*

A one-liter, three-necked reactor flask is equipped with a gas inlet tube, an addition funnel, a mechanical stirrer and a gas bubbler device so disposed that all exit gases from the flask pass upwardly therethrough, the bubbler device comprising a column containing a two-inch head of water. The reactor flask is charged with a solution mixture at ambient temperature (21° C.–23° C.) of 200 milliliters of concentrated aqueous solution of hydrochloric acid containing 37.7 percent HCl by weight and 200 milliliters of tetrahydrofuran.

Subsequently the flask system and the charge are purged substantially free of oxygen-containing gas with nitrogen gas, and then a total of 108 grams (1.5 moles) of isobutyraldehyde and 17 grams (0.5 mole) of gaseous phosphine, at ambient temperature (21° C.–23° C.), is slowly and continuously introduced into the charge over a period of 30 minutes.

A reaction mixture results which, after settling for 30 minutes, leaves an upper organic layer or phase which is separated from the remaining reaction mixture and distilled under reduced pressure. A total of 91 grams (78 percent of theory) of product 2,4,6-triisopropyl-1,3-dioxa-5-phosphacyclohexane is thus collected as a colorless liquid having a boiling point of 100° C.–101° C. at 8 millimeters pressure. The material has a pungent odor and a refractive index of $n_D^{25}$=1.4602.

*Analysis.*—Calculated for $C_{12}H_{25}O_2P$: C, 62.04; H, 10.85; P, 13.34. Found: C, 61.82; H, 10.78; P, 13.26.

EXAMPLE B

*2-(3-Hexyl)-4,6-Diisopropyl-1,3-Dioxa-5-Phosphacyclohexane*

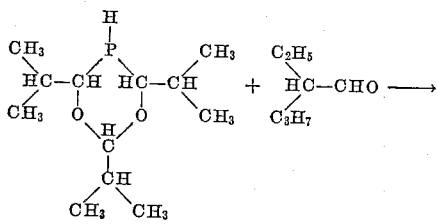

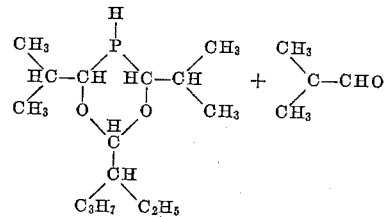

A solution of 11.6 grams (0.05 mole) of 2,4,6-triisopropyl-1,3-dioxa-5-phosphacyclohexane, produced as in Example A, above, 11.4 grams (0.1 mole) of 2-ethylpentaldehyde and 1 milliliter of a concentrated aqueous solution of hydrochloric acid containing 37.7 percent HCl by weight is prepared and heated to boiling in an apparatus arranged for slow distillation. Isobutyraldehyde is thus formed and collected slowly over a period of 2 hours and the product desired, 2-(3-hexyl)-4,6-diisopropyl-1,3-dioxa-5-phosphacyclohexane, is then recovered from the remaining solution in liquid form by fractional distillation at a reduced pressure.

Likewise, to illustrate the process and products of copending U.S. application Serial No. 41,027, now U.S. Patent No. 3,050,531, incorporated herein by reference, the following examples are provided:

EXAMPLE C

*1,3,5,7-Tetramethyl-2,6,10-Trioxa-9-Phosphatricyclo[3·3·1·1$^{3.7}$]Decane*

Into a 250-milliliter pressure bottle connected to and in communication with a reservoir containing phosphine gas under 4 atmospheres pressure, the pressure bottle being mounted on a shaking device, is placed a solution of 30.0 grams (0.3 mole) of 2,4-pentanedione in 40 milliliters of concentrated hydrochloric acid (37 percent by weight HCl) and 60 milliliters water. The space above this solution is filled with nitrogen gas and evacuated. Phosphine gas from the reservoir is then admitted to the pressure bottle and the reaction carried out under 2–3 atmospheres of phosphine. After 1½ hours 0.15 mole of phosphine is taken up. The excess phosphine gas is evacuated and the pressure bottle is filled with nitrogen gas. The resulting mixture is thrown onto ice with stirring. A white solid is collected and dried to give 26.3 grams (81 percent yield) of 1,3,5,7-tetramethyl-2,6,10-trioxa - 9 - phosphatricyclo[3·3·1·1$^{3.7}$]decane, melting point 89° C.–90° C. A purer sample is prepared by recrystallization from methanol-water, melting point 89° C.–90° C.

*Analysis.*—Calculated for $C_{10}H_{17}O_3P$: C, 55.55; H, 7.93; P, 14.33. Found: C, 55.51; H, 7.95; P, 14.15.

EXAMPLE D

*1,3,5,7-Tetra(Trifluoromethyl)-2,6,10-Trioxa-9-Phosphatricyclo[3·3·1·1$^{3.7}$]Decane*

Phosphine is reacted with 22.0 grams of 1,1,1,5,5,5-hexafluoro-2,4-pentanedione (0.1 mole) dissolved in 50 milliliters of benzene and 1 milliliter of methansulfonic acid by the same method as described in Example C, above. The resulting solution is distilled and the product collected (boiling point 83° C.–85° C./1.5 mm. Hg). Recrystallization from n-hexane gives a purer sample, melting point 72° C.–75° C.

The following examples are directed to the preparation of the novel products of the instant invention:

EXAMPLE I

*1,1-Diisobutyl-2,6-Dihydroxyphosphorinanium Chloride*

A solution of 9.0 grams of diisobutylphosphine (0.062 mole), 24.7 grams of 25 percent glutaraldehyde solution (0.062 mole), 50 milliliters of methanol, 25 milliliters of tetrahydrofuran and 7 milliliters of concentrated hydrochloric acid is placed in a 200 milliliter flask, purged with nitrogen, and the solution refluxed for 2 hours. The solvent is evaporated at reduced pressure to give a dark viscous solid which is recrystallized from acetone to obtain an analytical sample, melting point 150° C.–152° C. and identified as 1,1-diisobutyl-2,6-dihydroxyphosphorinanium chloride.

Except as indicated in Table I, which follows, the examples given therein are carried out essentially as in Example I, above.

TABLE I

| Example No. | $R^a{>}PH{<}R^b$ + $HC(O)-Y-CH(O)$ | | Molar ratio of phosphine to aldehyde | Mineral acid | Solvent | Temperature °C. | $R^a{>}P^+(X^-){<}R^b$ with CH(OH)-Y-CH(OH) |
|---|---|---|---|---|---|---|---|
| II | Diisobutylphosphine | Glutaraldehyde | 1:1 | HCl | Tetrahydrofuran | 30 | 1,1-diisobutyl-2,6-dihydroxyphosphorinanium chloride. |
| III | Diphenylphosphine | 3-chloroglutaraldehyde | 1:1 | HBr | Dioxane | 20 | 1,1-diphenyl-2,6-dihydroxy-4-chloro-phosphorinanium bromide. |
| IV | Bis(4-chlorophenyl)phosphine | 2-butylsuccinaldehyde | 1:1 | HCl | Ethanol | 15 | 1,1-bis(4-chlorophenyl)-2,5-dihydroxy-3-butylphospholanium chloride. |
| V | Didodecylphosphine | Phthalaldehyde | 0.9:1 | $H_2SO_6$ | Tetrahydrofuran | 5 | ($^1$). |
| VI | Dioctylphosphine | 3(p-chlorophenyl)-glutaraldehyde | 1:1 | HI | Dioxane | 0 | 1,1-dioctyl-2,6-dihydroxy-4-p-chlorophenylphosphorinanium iodide. |
| VII | Bis(2-butenyl)phosphine | 3-carbamylglutaraldehyde | 2:1 | $H_3PO_4$ | Tetrahydrofuran | 50 | 1,1-bis(2-butenyl)-2,6-dihydroxy-4-carbamylphosphorinanium phosphate. |
| VIII | Dicyclohexylphosphine | 2-hydroxyadipaldehyde | 1:1 | HBr | Dioxane | 15 | 1,1-dicyclohexyl-2,7-dihydroxy-3-hydroxyphosphepanium bromide. |

See footnote at end of table.

TABLE I—Continued

| Example No. | $R^a R^b PH$ | $HC(O)-Y-CH(O)$ | Molar ratio of phosphine to aldehyde | Mineral acid | Solvent | Temperature °C. | Product |
|---|---|---|---|---|---|---|---|
| IX | Bis(2,4,4-trimethylpentyl) phosphine. | 3-acyloxyglutaraldehyde | 1:1 | HCl | Diozane | 75 | 1,1-bis(2,4,4-trimethylpentyl)-2,6-dihydroxy-4-acyloxyphosphorinanium chloride. |
| X | Bis(2-phenylethyl)-phosphine. | 4-carboxyphthalaldehyde | 1:1 | H₂SO₄ | | 25 | (¹). |
| XI | Bis(3-methoxycyclohexyl) phosphine. | 2-carbomethoxysuccinaldehyde. | 1:8 | HBr | Propanol | 60 | 1,1-bis(3-methoxycyclohexyl)-2,5-dihydroxy-3-carbomethoxyphospholanium bromide. |
| XII | Bis(3-ethoxycyclopentenyl) phosphine. | 3-methoxyadipaldehyde | 1:1 | HI | Methanol | 10 | 1,1-bis(3-ethoxycyclopentyl)-2,7-dihydroxy-4-methoxyphosphepanium iodide. |
| XIII | 2,4,6-tris(3-heptyl)-1,3-dioxa-5-phosphacyclohexane. | 3-phenoxyphthalaldehyde | 1:15 | HCl | Tetrahydrofuran. | 20 | (¹). |
| XIV | 2,4,6-triisopropyl-1,3-dioxa-5-phosphacyclohexane. | 3-methylglutaraldehyde | 1:1 | H₃PO₄ | do | 20 | (¹). |
| XV | Bis(2-phenoxyethyl)phosphine. | Glutaraldehyde | 1:1 | HCl | Dioxane | 5 | 1,1-bis(2-phenoxyethyl)-2,6-dihydroxyphosphorinanium chloride. |
| XVI | Bis(2-aminoethyl)phosphine. | 2-hydroxyadipaldehyde | 12:1 | HCl | do | 0 | 1,1-bis(2-aminoethyl)-2,7-dihydroxy-3-hydroxyphosphepanium chloride. |
| XVII | Bis(2-nitropropyl)phosphine. | 2-butylsuccinaldehyde | 2:1 | HCl | Ethanol | 60 | 1,1-bis(2-nitropropyl)-2,5-dihydroxy-3-butylphospholanium chloride. |
| XVIII | Bis(2-sulfoethyl)phosphine. | Phthalaldehyde | 1:1 | H₃PO₄ | do | 35 | (¹). |
| XIX | Bis(carbamylmethyl)-phosphine. | 3-carbamylglutaraldehyde | 1:2 | HBr | Butanol | 10 | 1,1-bis(carbamylmethyl)-2,6-dihydroxy-4-carbamylphosphorinanium bromide. |
| XX | Bis(hydroxymethyl)phosphine. | 4-carboxyphthalaldehyde | 1:2 | HI | do | 15 | (¹). |
| XXI | Bis(2-ureidoethyl)phosphine. | 2-methyleneglutaraldehyde | 1:4 | HCl | Dioxane | 20 | 1,1-bis(2-ureidoethyl)-2,6-dihydroxy-3-methylenephosphorinanium chloride. |
| XXII | Bis(3-carboxypropyl)-phosphine. | 3(p-chlorophenyl)glutaraldehyde. | 1:6 | H₂SO₄ | do | 55 | 1,1-bis(3-carboxypropyl)-2,6-dihydroxy-4-(p-chlorophenyl)phosphorinanium sulfate. |
| XXIII | Bis(3-carbethoxypropyl)-phosphine. | Glutaraldehyde | 2:1 | HNO₃ | Tetrahydrofuran. | 90 | 1,1-bis(3-carbethoxypropyl)-2,6-dihydroxyphosphorinanium nitrate. |
| XXIV | Bis(4-aminophenyl)phosphine. | 3-acyloxyglutaraldehyde | 1:2 | H₂SO₄ | do | 40 | 1,1-bis(4-aminophenyl)-2,6-dihydroxy-4-acyloxyphosphorinanium sulfate. |
| XXV | Bis[2(4-aminophenyl)-ethyl] phosphine. | 2-butylsuccinaldehyde | 1:1 | HBr | Ethanol | 65 | 1,1-bis[2(4-aminophenyl)ethyl]-2,5-dihydroxy-3-butylphospholanium bromide. |
| XXVI | 1,3,5,7-tetramethyl-2,6,10-trioxa-9-phosphatricyclo[3.3.1.1.³·⁷]decane. | Glutaraldehyde | 1:1 | HCl | do | 20 | (¹). |
| XXVII | 1,3,5,7-tetra(trifluoromethyl)2,6,10-trioxa-9-phosphatricyclo[3.3.1.1.³·⁷]decane. | 3-methoxyadipaldehyde | 1:1 | HCl | Methanol | 10 | (¹). |
| XXVIII | Dibutylphosphine | Glutaraldehyde | 1:1 | HCl | do | 60 | 1,1-dibutyl-2,6-dihydroxyphosphorinanium chloride. |
| XXIX | Dioctylphosphine | do | 1:1 | HCl | Ethanol | 30 | 1,1-dioctyl-2,6-dihydroxyphosphorinanium chloride. |
| XXX | Dicyclohexylphosphine | do | 1:1.2 | HCl | Methanol | 60 | 1,1-dicyclohexyl-2,6-dihydroxyphosphorinanium chloride. |
| XXXI | Dibutylphosphine | Succinaldehyde | 1:1 | HCl | do | 70 | 1,1-dibutyl-2,5-dihydroxyphospholanium chloride. |
| XXXII | Diisobutylphosphine | do | 1:1 | HCl | Ethanol | 60 | 1,1-diisobutyl-2,5-dihydroxyphospholanium chloride. |
| XXXIII | 1,3,5,7-tetramethyl-2,6,10-trioxa-9-phosphatricyclo[3.3.1.1.³·⁷]decane. | do | 1:1 | HCl | Methanol | 60 | (¹). |

¹ To illustrate the products of the present invention by formulae the following typical examples are provided:

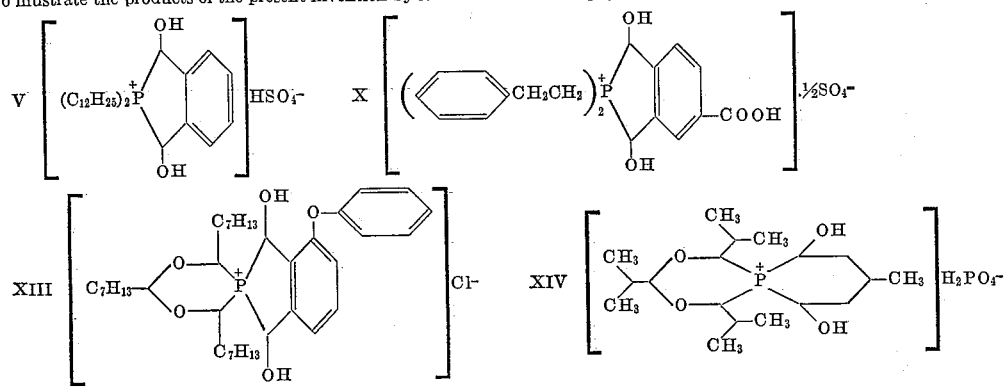

Footnote continued at top of following page.

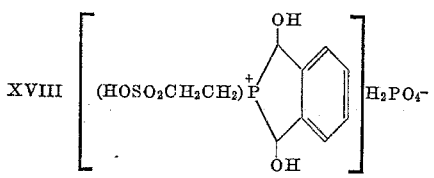
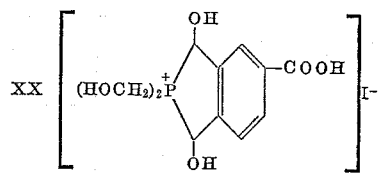
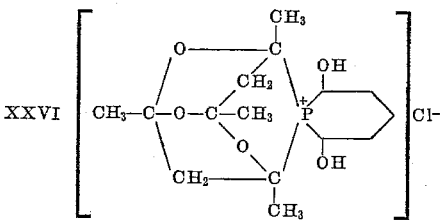
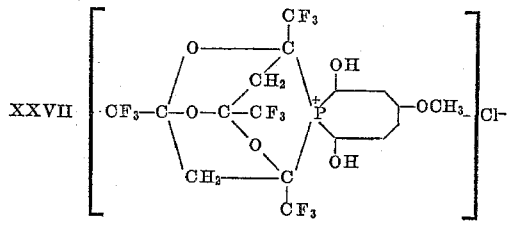
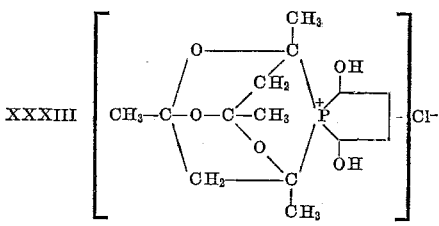

EXAMPLE XXXIV

*1,1-Dibutyl-2,5-Dihydroxyphospholanium Nitrate*

A solution of 28.3 grams of 1,1-dibutyl-2,5-dihydroxyphospholanium chloride (produced as in Example XXXI, above) in 400 milliliters of water is reacted with a solution of 15.4 grams of silver nitrate in 100 milliliters of water. The mixture is filtered and the filtrate evaporated to give the product, 1,1-dibutyl-2,5-dihydroxyphospholanium nitrate.

EXAMPLE XXXV

*1,1-Dibutyl-2,5-Dihydroxyphospholanium Tartrate*

A solution of 28.3 grams of 1,1-dibutyl-2,5-dihydroxyphospholanium chloride (produced as in Example XXXI, above) in 400 milliliters of water is reacted with 18.4 grams silver tartrate suspended in 500 milliliters of water. The mixture is stirred for several hours. The resulting slurry is filtered and the product, 1,1-dibutyl-2,5-dihydroxyphospholanium tartrate, is recovered by evaporation of the filtrate.

EXAMPLE XXXVI

*1,1-Bis(3-Carboxypropyl)-2,6-Dihydroxy-4-(p-Chlorophenyl)Phosphorinanium Acetate*

A solution of 0.1 mole of 1,1-bis(3-carboxypropyl)-2,6-dihydroxy - 4 - (p-chlorophenyl)phosphorinanium sulfate (produced as in Example XXII, above) in 1 liter of water is reacted with 0.05 mole of barium acetate in 50 milliliters of water. The resulting mixture is filtered and the filtrate evaporated to give the product, 1,1-bis(3-carboxypropyl) - 2,6 - dihydroxy-4-(p-chlorophenyl)phosphorinanium acetate.

EXAMPLE XXXVII

*1,1-Dibutyl-2,6-Dihydroxyphosphorinanium Chloride*

Into a 100 milliliter distilling flask, purged with nitrogen, is placed 14.5 grams of dibutyl phosphine (0.10 mole) and 40.0 grams of 25 percent glutaraldehyde (0.10 mole) dissolved in 35 milliliters of tetrahydrofuran. To this is added 10.5 milliliters of concentrated HCl (0.11 mole) slowly with stirring to form a homogeneous solution which is allowed to stand for 24 hours. The solvents are evaporated at reduced pressure to yield a brown viscous solid. This is recrystallized from acetone, then chloroform, and twice more from acetone, to give 1,1-dibutyl-2,6-dihydroxyphosphorinanium chloride in very desirable yield.

The organophosphorus compounds of the present invention are useful as herbicides, fungicides, and nematocides. For instance, the products of Examples I, XXVII, XXIX, and XXX, when prepared in separate 0.1% by weight concentrations in water, are brought into contact with nematodes by admixing nematodes therewith and maintaining this contact for a 20-hour period. Immediately thereafter percent mortality is recorded. The activity is as follows:

TABLE II

| Example No.: | Nematocide, percent kill, vinegar eel worms Anguillula |
|---|---|
| I | 75 |
| XXVII | 100 |
| XXIX | 100 |
| XXX | 50 |

Obviously, these are merely representative and the remaining compounds of the present invention manifest varying degrees of nematocidal activity.

The products of Examples I, XXVII, XXVIII, and XXIX, for instance, are useful as herbicides in a concentration of 0.1% water.

About 50 seeds of each species, wheat and radish, are placed in special one ounce bottles together with 25 cubic centimeters of water containing 0.1% by weight of the organophosphorus compound. After 20 hours the seeds are removed, water washed, and allowed to germinate for 5 days. At the end of this period percent mortality is recorded as follows:

TABLE III

| Product of Example No. | Herbicide percent kill, seeds of— | |
|---|---|---|
| | Wheat | Radish |
| I | 40 | 96 |
| XXVII | 80 | 4 |
| XXVIII | 40 | 98 |
| XXIX | 10 | 94 |

As in the case of the nematocidal activity, varying degrees of herbicidal activity are realized throughout the spectrum of the novel compounds of the present invention.

Fungicidal activity has also been shown by the compounds of the present invention. Two water mixtures of 0.01% by weight and 0.001% by weight, respectively, of 1,1-dicyclohexyl - 2,6 - dihydroxy-phosphoniacyclohexane chloride produced according to Example XXX, above, are prepared and spores admixed therewith for a 20-hour period. After this period the spores are examined microscopically to determine percent germination. The results in the case of these various concentrations of the product of Example XXX are as follows:

TABLE IV

| Example No. | Fungicide, percent kill of spores | |
|---|---|---|
| | Monolinia fructigena | Stemphylium sarcinaeforme |
| XXX (0.01%) | 100 | 100 |
| XXX (0.001%) | | 100 |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A heterocyclic phosphonium salt of the formula

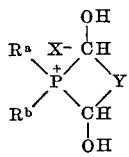

wherein X represents the anion of a water-soluble acid; Y represents a member selected from the group consisting of substituted and unsubstituted, branched and straight chain alkylene providing 2 to 4 carbon atoms in the phosphorus-containing ring, substituted and unsubstituted arylene in which from two to four consecutive ring carbon atoms of the arylene ring provide, respectively, from two to four consecutive carbon atoms in the phosphorus-containing ring, said subsituents for alkylene and arylene being selected from the group consisting of halogen, hydroxyl, carbamyl, carbalkoxy, carboxy, lower alkoxy, phenyl and phenoxy; $R^a$ and $R^b$, respectively, represent a member selected from the group consisting of substituted and unsubstituted, branched and straight chain alkyl, in which said alkyl has from 1 to 18 carbon atoms, substituted and unsubstituted, branched and straight chain alkenyl, in which said alkenyl has from 1 to 18 carbon atoms, said substituents for alkyl and alkenyl being on a carbon atom at least 3 carbon atoms removed from the phosphorus atom of the formula, substituted and unsubstituted cycloalkyl, substituted and unsubstituted cycloalkenyl, substituted and unsubstituted phenyl, said substituents for alkyl, alkenyl, cycloalkyl, cycloalkenyl and phenyl being selected from the group consisting of halogen, hydroxyl, carbamyl, carbalkoxy, carboxy, lower alkoxy, phenyl, phenoxy, amino, nitro, ureido and sulfo; $R^a$ and $R^b$, respectively, are attached directly to the phosphorus atom, and $R^a$ and $R^b$ combined form a cyclic secondary phosphine selected from the group consisting of a 2,4,6-trisecondary-alkyl-1,3-dioxa-5-phosphacyclohexane of the formula

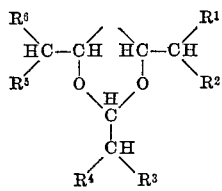

wherein $R^1$ to $R^6$ are, respectively, alkyl having 1 to 10 carbon atoms and a 1,3,5,7-tetraalkyl-2,6,10-trioxa-9-phosphatricyclo[3·3·1·1$^{3,7}$]decane of the formula

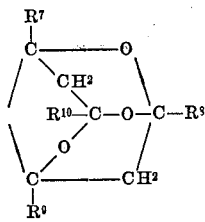

wherein $R^7$, $R^8$, $R^9$ and $R^{10}$, respectively, represent a member selected from the group consisting of $CF_3$ and lower alkyl.

2. 1,1 - diisobutyl - 2,6 - dihydroxyphosphorinanium chloride.

3. 1,1 - bis(4 - chlorophenyl) - 2,5 - dihydroxy - 3-butylphospholanium nitrate.

4. The compound

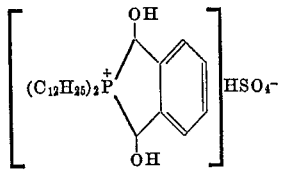

5. The compound

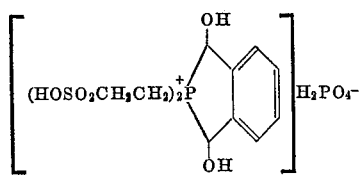

6. 1,1 - dibutyl - 2,5 - dihydroxyphospholanium chloride.

7. 1,1 - bis(3 - carboxypropyl) - 2,6 - dihydroxy-4-(p-chlorophenyl)phosphorinanium sulfate.

8. 1,1 - diisobutyl - 2,5 - dihydroxyphospholanium chloride.

9. The compound

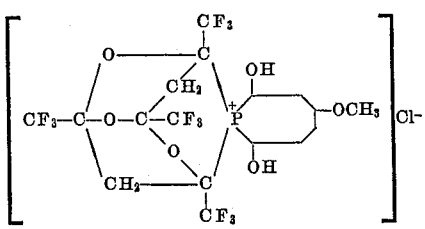

10. The compound

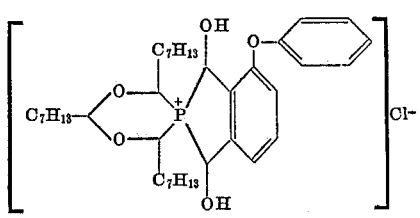

11. The compound
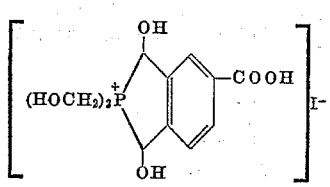
References Cited in the file of this patent
UNITED STATES PATENTS
| | | |
|---|---|---|
| 2,984,683 | Buckler | May 16, 1961 |
| 3,026,327 | Epstein et al. | Mar. 20, 1962 |
| 3,050,531 | Epstein et al. | Aug. 21, 1962 |
OTHER REFERENCES
Patterson et al.: "The Ring Index," Second Edition, page 471 (1960).